United States Patent
Samudrala et al.

(10) Patent No.: US 10,687,389 B2
(45) Date of Patent: Jun. 16, 2020

(54) WIRELESS INDUSTRIAL REMOTE CONTROLLER FOR INDUSTRIAL PROCESS CONTROL AND AUTOMATION SYSTEMS OR OTHER SYSTEMS

(71) Applicant: Honeywell International Inc., Morris Plains, NJ (US)

(72) Inventors: Prasad Samudrala, Bangalore (IN); Satish C. Madappa, Bangalore (IN); Falgun D. Bhayani, Bangalore (IN); Krishna Praveen Ranjith Kumar, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 7 days.

(21) Appl. No.: 15/997,946

(22) Filed: Jun. 5, 2018

(65) Prior Publication Data

US 2019/0239285 A1 Aug. 1, 2019

Related U.S. Application Data

(60) Provisional application No. 62/623,253, filed on Jan. 29, 2018.

(51) Int. Cl.
*H04W 88/10* (2009.01)
*H04L 29/06* (2006.01)
(Continued)

(52) U.S. Cl.
CPC ............. *H04W 88/10* (2013.01); *H04L 67/12* (2013.01); *H04L 69/08* (2013.01); *H04W 4/38* (2018.02);
(Continued)

(58) Field of Classification Search
CPC . H04W 88/10; H04W 76/15; H04W 56/0005; H04W 72/0433; H04L 69/08; H04L 67/12; H04L 29/06; H04L 29/08
(Continued)

(56) References Cited

U.S. PATENT DOCUMENTS 6,771,966 B1   8/2004   Chow
6,865,591 B1   3/2005   Garg et al.
(Continued)

OTHER PUBLICATIONS

Mangharam et al., "Embedded Virtual Machines for Robust Wireless Control Systems", 29th IEEE Int'l. Conf. on Distributed Computing Systems, Jun. 2009, 6 pages.
(Continued)

*Primary Examiner* — Man U Phan (57) ABSTRACT

An apparatus includes a wireless controller having at least one processor and a radio frequency (RF) module. The at least one processor is configured to execute control logic in order to determine how to adjust at least one actuator based on data from at least one sensor. The RF module is configured to communicate wirelessly with the sensor(s) and/or actuator(s) over one or more wireless networks. The at least one processor is also configured to function as a gateway for each wireless network. The RF module is also configured to function as an access point for each wireless network. The at least one processor could be configured to execute multiple protocol stacks to function as the gateway for the multiple wireless networks, and the RF module could be associated with multiple access point protocol stacks to function as the access point for the multiple wireless networks.

11 Claims, 8 Drawing Sheets

(51) Int. Cl.
*H04W 76/15* (2018.01)
*H04L 29/08* (2006.01)
*H04W 4/38* (2018.01)
*H04W 4/70* (2018.01)
*H04W 72/04* (2009.01)
*H04W 56/00* (2009.01)

(52) U.S. Cl.
CPC ............. *H04W 4/70* (2018.02); *H04W 76/15* (2018.02); *H04W 56/0005* (2013.01); *H04W 72/0433* (2013.01)

(58) Field of Classification Search
USPC ........................................................ 370/329
See application file for complete search history.

(56) References Cited

U.S. PATENT DOCUMENTS

| | | | |
|---|---|---|---|
| 7,228,186 B2* | 6/2007 | Karschnia | G05B 19/054 |
| | | | 370/410 |
| 7,697,492 B2* | 4/2010 | Petite | G01V 1/364 |
| | | | 370/338 |
| 7,792,126 B1 | 9/2010 | Montestruque et al. | |
| 7,860,495 B2 | 12/2010 | McFarland | |
| 8,350,691 B2 | 1/2013 | McFarland | |
| 8,442,071 B2* | 5/2013 | Ishii | H04B 7/155 |
| | | | 370/235 |
| 8,582,470 B2 | 11/2013 | Collins et al. | |
| 8,948,067 B2 | 2/2015 | Chernoguzov et al. | |
| 9,219,760 B2* | 12/2015 | Flanders | G05B 19/4185 |
| 9,544,081 B2 | 1/2017 | Samudrala et al. | |
| 9,661,079 B2 | 5/2017 | Pulini et al. | |
| 9,705,934 B2* | 7/2017 | Flanders | G05B 19/4185 |
| 9,753,439 B2* | 9/2017 | Armstrong | H04W 4/023 |
| 9,858,805 B2* | 1/2018 | McLaughlin | G05B 19/4186 |
| 9,875,207 B2 | 1/2018 | Lv et al. | |
| 10,095,594 B2* | 10/2018 | Vanderah | G06F 13/364 |
| 10,367,573 B2* | 7/2019 | Fujimoto | H04B 7/212 |
| 10,375,162 B2* | 8/2019 | Toepke | H04L 41/12 |
| 2002/0045969 A1 | 4/2002 | Dierauer | |
| 2005/0005200 A1 | 1/2005 | Matena et al. | |
| 2005/0164684 A1 | 7/2005 | Chen et al. | |
| 2005/0201297 A1 | 9/2005 | Peikari | |
| 2006/0028997 A1 | 2/2006 | McFarland | |
| 2006/0120411 A1 | 6/2006 | Basu | |
| 2007/0156253 A1* | 7/2007 | De Silvio | G05B 19/056 |
| | | | 700/6 |
| 2008/0225737 A1 | 9/2008 | Gong et al. | |
| 2008/0267259 A1 | 10/2008 | Budampati et al. | |
| 2009/0034457 A1 | 2/2009 | Bahl et al. | |
| 2009/0062931 A1 | 3/2009 | Keyes, IV et al. | |
| 2009/0102640 A1 | 4/2009 | McFarland | |
| 2013/0021167 A1* | 1/2013 | Harper, Jr. | G05B 9/02 |
| | | | 340/870.01 |
| 2013/0136019 A1* | 5/2013 | Fujimoto | H04W 24/02 |
| | | | 370/252 |
| 2015/0278144 A1 | 10/2015 | McLaughlin et al. | |
| 2017/0344451 A1* | 11/2017 | Vanderah | G06F 13/4068 |
| 2019/0286110 A1* | 9/2019 | Alkhabbaz | G05B 19/4186 |

OTHER PUBLICATIONS

Hill et al., "System Architecture Directions for Networked Sensors", ASPLOS-IX, Nov. 2000, 12 pages.
Levis et al., "Mate: A Tiny Virtual Machine for Sensor Networks", ACM ASPLOS-X, 2002, 11 pages.
Stanley-Marbell et al., "Scylla: A Smart Virtual Machine for Mobile Embedded Systems", WMCSA, 2000, 10 pages.
Muller et al., "A Virtual Machine for Sensor Networks", ACM EuroSys, 2007, 14 pages.
Han et al., "A Dynamic Operating System for Sensor Nodes", MobiSys, Third International Conference on Mobile Systems, Applications, and Services, 2005, p. 163-176.
Dunkels et al., "Run-Time Dynamic Linking for Reprogramming Wireless Sensor Networks", SenSys '06, Nov. 2006, 14 pages.
Mangharam et al., "FireFly: A Cross-Layer Platform for Real-Time Sensor Networks", Real Time Systems Journal, 2007, 40 pages.
Hill et al., "The Platforms Enabling Wireless Sensor Networks", Communications of the ACM, vol. 47, No. 6, Jun. 2004, p. 41-46.
Rowe et al., "RT-Link: A Time-Synchronized Link Protocol for Energy-Constrained Multi-hop Wireless Networks", IEEE SECON, 2006, 10 pages.
Mangharam et al., "Voice over Sensor Networks", RTSS, 2006, 10 pages.
Polastre et al., "Versatile Low Power Media Access for Wireless Sensor Networks", SenSys '04, Nov. 2004, 13 pages.
Ye et al., "An Energy-Efficient MAC protocol for Wireless Sensor Networks", USC/ISI Technical Report ISI-TR-543, INFOCOM, Jun. 2002, p. 1-10.
"FireFly 2.2 Datasheet", Wireless Sensor Networks, Aug. 20, 2007, 24 pages.
"Nano-RK: A Wireless Sensor Networking Real-Time Operating System", http://nanork.org/wiki, 2009, 3 pages.
"Yokogawa Releases ISA100 Wireless Gateway Module—Ideal for constructions of small-scale field wireless systems", Yokogawa Electric Corporation Press Release, Nov. 2017, 3 pages.
"Yokogawa Field Wireless Solution", Yokogawa Electric Corporation, 2015, 16 pages.
"Emerson Smart Wireless Gateway 1410", Product Data Sheet, Emerson, Aug. 2014, 12 pages.

* cited by examiner

WIRELESS INDUSTRIAL REMOTE CONTROLLER FOR INDUSTRIAL PROCESS CONTROL AND AUTOMATION SYSTEMS OR OTHER SYSTEMS

CROSS-REFERENCE TO RELATED APPLICATION AND PRIORITY CLAIM

This application claims priority under 35 U.S.C. § 119(e) to U.S. Provisional Patent Application No. 62/623,253 filed on Jan. 29, 2018. This provisional application is hereby incorporated by reference in its entirety.

TECHNICAL FIELD

This disclosure generally relates to industrial process control and automation systems. More specifically, this disclosure relates to a wireless industrial remote controller for industrial process control and automation systems or other systems.

BACKGROUND

Industrial process control and automation systems are often used to automate large and complex industrial processes. These types of systems routinely include various components including sensors, actuators, and process controllers. Some of the process controllers can receive measurements from the sensors and generate control signals for the actuators.

While originally viewed negatively due to actual or perceived concerns over reliability, it has become common for wireless devices to be used for data acquisition and monitoring functions in control and automation systems. Data acquisition functions generally relate to capturing data associated with one or more industrial processes and relaying that data to one or more destinations. Monitoring functions generally relate to monitoring the operation of one or more industrial processes in order to identify abnormal or other conditions associated with the industrial processes.

SUMMARY

This disclosure provides a wireless industrial remote controller for industrial process control and automation systems or other systems.

In a first embodiment, an apparatus includes a wireless controller. The wireless controller includes at least one processor configured to execute control logic in order to determine how to adjust at least one actuator based on data from at least one sensor. The wireless controller also includes a radio frequency (RF) module configured to communicate wirelessly with at least one of the at least one sensor and the at least one actuator over one or more wireless networks. The at least one processor is also configured to function as a gateway for each of the one or more wireless networks. The RF module is also configured to function as an access point for each of the one or more wireless networks.

In a second embodiment, a method includes operating a wireless controller to function as a gateway for each of one or more wireless networks. The method also includes operating the wireless controller to function as an access point for each of the one or more wireless networks. The method further includes executing control logic at the wireless controller in order to determine how to adjust at least one actuator based on data from at least one sensor. In addition, the method includes communicating wirelessly with at least one of the at least one sensor and the at least one actuator over the one or more wireless networks.

In a third embodiment, at least one non-transitory computer readable medium contains instructions that when executed cause a wireless controller to function as a gateway for each of one or more wireless networks and to function as an access point for each of the one or more wireless networks. The at least one medium also contains instructions that when executed cause the wireless controller to execute control logic at the wireless controller in order to determine how to adjust at least one actuator based on data from at least one sensor. The at least one medium further contains instructions that when executed cause the wireless controller to communicate wirelessly with at least one of the at least one sensor and the at least one actuator over the one or more wireless networks.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, it has become common for wireless devices to be used for data acquisition and monitoring functions in industrial process control and automation systems. However, process controllers that execute control logic and that generate control signals for adjusting industrial processes have often not been implemented as wireless devices due to reliability concerns or other concerns. When wireless process controllers have been attempted, they have typically been targeted for large segment markets without meeting cost and functional requirements for small- and medium-scale industries. For example, some prior approaches offer wireless gateways and wireless access points as separate components, and a separate controller is needed to implement wireless control in this architecture. Unfortunately, wireless deployments are often limited in size, and the resulting infrastructure costs can be high per wireless input/output (I/O) channel in an overall system implemented in this manner. Also, access points often require additional power (such as two watts), which increases the power supply requirements and further increases the costs of the overall system. As a result, these prior approaches can be a very expensive solution, particularly for small- and medium-scale deployments.

This disclosure provides a field-mountable remote wireless controller that integrates a process controller with a wireless gateway and a wireless access point into a single functional unit. As a particular example, remote terminal units (RTUs) are often installed at remote sites to support I/O and local control functions. Low-power wireless radios can be integrated into RTUs or other field-mountable remote wireless controllers, and the RTUs or other field-mountable remote wireless controllers can be modified to support wireless gateway and wireless access point functionality. This allows the RTUs or other field-mountable remote wireless controllers to support dual roles (namely gateway and access point roles) while also supporting control functionality.

The field-mountable remote wireless controller can also support a number of additional features. For example, multiple field-mountable remote wireless controllers can provide an alternate instrumentation for a wireless network, such as in small-scale deployments, meaning fewer or no separate components may be needed to form a wireless network. The field-mountable remote wireless controller can also support field gateway concepts (such as "Zone2" concepts) and support control over wireless applications. The field-mountable remote wireless controller can further support field engineering over wireless so that personnel in the field can perform functions over wireless connections (such as by supporting features like BLUETOOTH LOW ENERGY connections and "connected platform" offerings). The field-mountable remote wireless controller can also leverage the functionality of existing or new gateways. In addition, the field-mountable remote wireless controller can provide redundant and non-redundant operation and support one or multiple wireless protocols as needed or desired.

These approaches therefore help to reduce the cost of an overall solution and provide improvements in terms of cost and energy consumption, which can be beneficial in various environments (such as at remote sites). For example, a low-power wireless radio in a field-mountable remote wireless controller could consume about 0.05 watts to about 0.10 watts of power compared to two watts of power consumed by a standard access point. Also, RTUs are often integrated with solar panels and battery banks to provide operating power to the RTUs. The approaches described in this patent document can reduce the numbers of solar panels and battery banks at the remote sites by offering solutions with reduced energy consumption. As a result, the field-mountable remote wireless controllers can provide more cost-effective solutions for small- and medium-scale deployments. Of course, the field-mountable remote wireless controllers could be used in large-scale deployments, as well.

Figure 1:
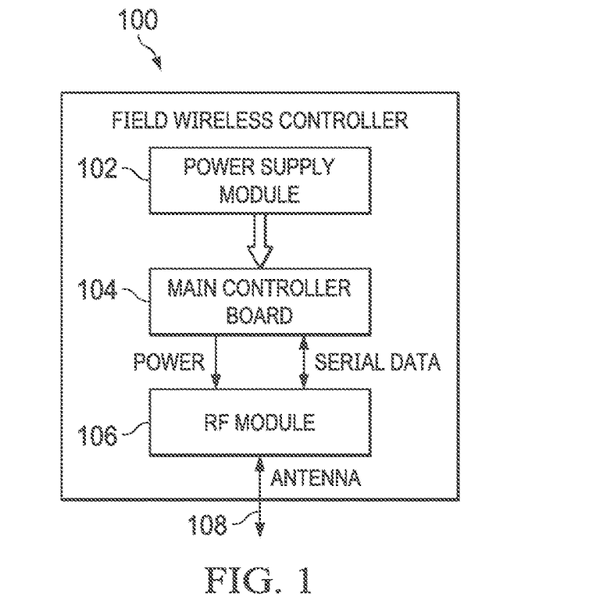
FIG. 1 illustrates an example field-mountable remote wireless controller in accordance with this disclosure.

FIG. 1 illustrates an example field-mountable remote wireless controller 100 in accordance with this disclosure. As shown in FIG. 1, the wireless controller 100 includes a power supply module 102, which provides operating power for the wireless controller 100. For example, the power supply module 102 could represent circuitry configured to receive power from one or more batteries, solar cells, fuel cells, or other source(s) of electrical power. The power supply module 102 could also include circuitry configured to condition or otherwise alter the power from the source(s) into suitable voltage(s) or current(s) for use by other components of the wireless controller 100. The power supply module 102 includes any suitable structure for providing power to other components of a wireless controller. As particular examples, the power supply module 102 could represent a direct current-to-direct current (DC-DC) converter or an alternating current-to-direct current (AC-DC) converter.

The wireless controller 100 also includes a main controller board 104. The main controller board 104 generally includes one or more processors that execute logic for controlling the overall operation of the wireless controller 100 and for interacting with other components of a larger system. The main controller board 104 can also include or be coupled to one or more I/O terminals for interacting with other components of a larger system. For example, the I/O terminals could be coupled to one or more sensors and one or more actuators at a remote site or other location. Note, however, that the use of physical connections to the sensors and actuators are not required and that wireless communications with the sensors and actuators could also be used. The processor(s) of the main controller board 104 could execute control logic that uses inputs from one or more sensors in order to generate outputs for one or more actuators. The processor(s) of the main controller board 104 could also perform other functions as needed or desired.

In some embodiments, the wireless controller 100 represents an RTU, such as one that is described in U.S. Patent Publication No. 2015/0278144 (which is hereby incorporated by reference in its entirety). In these embodiments, the main controller board 104 could represent the "kernel board" in such an RTU. As described in U.S. Patent Publication No. 2015/0278144 and below, the kernel board can be coupled to other circuit boards, such as an Input Output Termination Assembly (IOTA) board and an application board. However, the functional division between boards or other components of the wireless controller 100 is not material to the design in FIG. 1, and the main controller board 104 could include some or all of the functionality of the RTU.

The main controller board 104 can execute any suitable control logic in order to facilitate control over one or more industrial processes (or portions thereof) or other processes. For example, in some embodiments, the main controller board 104 executes traditional control blocks (such as proportional-integral-derivative or "PID" control blocks) or other control logic along with optimized wireless control blocks (such as PIDPlus control blocks) or other control logic specially designed for wireless control applications. The control logic executed by the main controller board 104 can be used to receive inputs from one or more sensors, process the inputs, and generate outputs for one or more actuators. Also, in some embodiments, the main controller board 104 or the wireless controller 100 supports remote programming of the wireless controller 100, such as by supporting the IEC-61131 standard. This allows the wireless controller 100 to be programmed through a software application, which could reside locally or remotely (such as in a cloud environment). Among other things, this could allow the control logic executed by the main controller board 104 to be updated or replaced as needed or desired.

The wireless controller 100 further includes a radio frequency (RF) module 106, which facilitates the transmission and reception of wireless signals. The RF module 106 includes any suitable structure for generating signals for wireless transmission and processing signals received wirelessly, such as a transmitter and a receiver or a transceiver. In some embodiments, the RF module 106 could represent a small module, such as a 1 inch-by-1 inch (2.54 cm-by-2.54 cm) module like the ONEWIRELESS GXRM wireless module from HONEYWELL INTERNATIONAL INC. Of course, any other suitable RF module 106 (including small RF modules) could be used here. The RF module 106 could support communications over any suitable wireless network or networks, such as when the RF module 106 supports one or more IEEE 802.15.4 standards for communication over one or more low-rate wireless personal area networks (LR-WPANs). As particular examples, the RF module 106 could support communications using one or more industrial wireless protocols, such as an ISA100 protocol and a Wireless Highway Addressable Remote Transducer (WirelessHART) protocol.

The RF module 106 is coupled to at least one antenna 108, which transmits wireless signals from the wireless controller 100 and receives wireless signals at the wireless controller 100. Each antenna 108 includes any suitable structure for transmitting and receiving wireless signals. Note that a single antenna 108 or multiple antennas 108 in any suitable arrangement could be used here. If multiple antennas are used, the RF module 106 could support functions such as beamforming and directional transmissions. Also note that the antenna 108 could be positioned local to the wireless controller 100, or the antenna 108 could be positioned remote from the wireless controller 100 (such as when the antenna 108 is coupled to the RF module 106 via a cable).

In this example, the RF module 106 receives operating power from the power supply module 102 through the main controller board 104. Note, however, that this is not required, and the RF module 106 could be powered in any other suitable manner (such as directly by the power supply module 102). Also, in this example, the main controller board 104 and the RF module 106 are shown as exchanging serial data signals. Again, this is not required, and the main controller board 104 and the RF module 106 could exchange any other suitable data signals.

Figure 2:
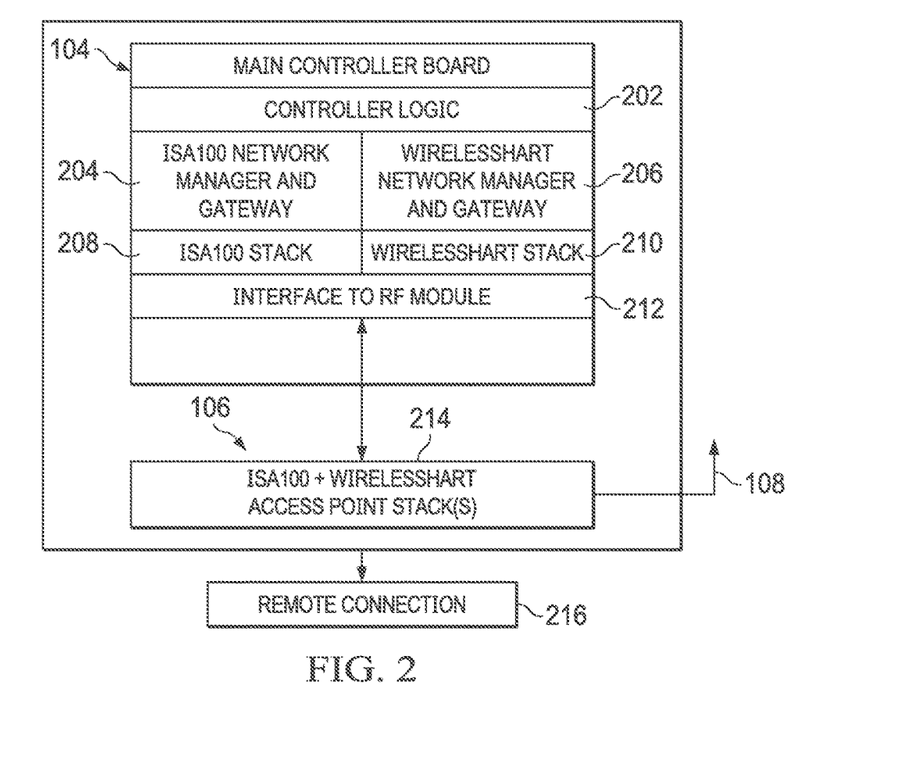
FIG. 2 illustrates additional details of components of the field-mountable remote wireless controller in accordance with this disclosure.

FIG. 2 illustrates additional details of components of the field-mountable remote wireless controller 100 in accordance with this disclosure. In particular, FIG. 2 illustrates example components of the main controller board 104 and the RF module 106. Note, however, that other implementations of the main controller board 104 and the RF module 106 could be used.

As shown in FIG. 2, the controller board 104 includes controller logic 202, which represents the logic executed by one or more processors or that is otherwise executed in order to control one or more components of an industrial process or other process. In general, the controller logic 202 typically uses data from one or more sensors or other sources in order to generate one or more control signals for one or more actuators. The actuators use the control signals to make adjustments to at least one industrial process or other process. Any suitable controller logic 202 could be used in or executed by the controller board 104, such as function blocks, ladder logic, user-structured text and programming, or sequence operations. In some embodiments, the controller logic 202 includes one or more control loops. Each control loop can be executed at a specified interval (such as 250 milliseconds) and can be used for critical or non-critical control applications.

The controller board 104 also includes multiple network managers and gateways 204-206, which could be executed by one or more processors or otherwise executed to control the use of multiple wireless networks. The gateways function to route data between a wireless network and another network, such as an Ethernet network or other network coupled to the wireless controller 100 or another wireless network accessible by the wireless controller 100. The network managers function to provide high-level management regarding the use of a wireless network. In this example, the network managers and gateways 204-206 are associated with two specific protocols, namely the ISA100 and WirelessHART protocols. In particular embodiments, the network manager and gateway 204 could implement a ONEWIRELESS WIRELESS DEVICE MANAGER (WDM) from HONEYWELL INTERNATIONAL INC. that hosts an ISA100 wireless system manager, security manager, and gateway. Similarly, in particular embodiments, the network manager and gateway 206 could implement a WirelessHART manager that hosts a WirelessHART wireless system manager, security manager, and gateway. However, the controller board 104 could support the use of any other or additional wireless protocol(s), and a single protocol or more than two protocols could be supported.

The controller board 104 further includes multiple wireless stacks 208-210, which could be executed by one or more processors or otherwise executed to communicate over multiple wireless networks. The wireless stacks 208-210 implement different functionalities to support wireless communications. For example, each of the wireless stacks 208-210 could include a physical layer, data link layer, network layer, transport layer, or other layer(s) that enable communications over a wireless network. Again, in this example, the wireless stacks 208-210 are associated with two specific protocols, namely the ISA100 and WirelessHART protocols. However, the wireless stacks 208-210 could support the use of any other or additional wireless protocol(s), and a single protocol or more than two protocols could be supported.

In addition, the controller board 104 includes an interface 212 to the RF module 106. The interface 212 denotes any suitable structure that allows data and optionally power to pass between the controller board 104 and the RF module 106. In some embodiments, the interface 212 could denote a four-wire interface used to transport serial data, although other interfaces could be used to support the transport of data in any suitable format.

As shown in FIG. 2, the RF module 106 includes or is used in conjunction with at least one access point stack 214, which could be executed by one or more processors or otherwise executed to provide access point functionality for other components wishing to communicate over one or more wireless networks or other networks. The access point functions to support communication with and among different devices over one or more wireless networks. Each access point stack 214 therefore implements different functionalities to support communications over a wireless network. For example, each access point stack 214 could include a physical layer, data link layer, network layer, transport layer, or other layer(s) that enable communications over a wireless network. There could be a single access point stack 214 to enable access point functionality for a single wireless network, or there could be multiple access point stacks 214 to enable access point functionality for multiple wireless networks. Once again, in this example, access point stacks 214 are associated with two specific protocols, namely the ISA100 and WirelessHART protocols. However, the access point stack(s) 214 could support the use of any other or additional wireless protocol(s), and a single protocol or more than two protocols could be supported.

If needed or desired, the wireless controller 100 can have the ability to communicate with one or more remote devices or systems using at least one remote connection 216. Any suitable remote connection 216 could be used here, such as a cellular connection (like a 4G, LTE, or 5G cellular connection) or other long-range connection, which can be referred to as a backhaul connection. The remote connection 216 could be used by the wireless controller 100 at any suitable times, such as when communication over a local network fails or when no local network is available. The remote connection 216 could be used to support functions such as cloud-based storage of data that is used, generated, or collected by the wireless controller 100.

In addition to the cost and energy reductions described above, the wireless controller 100 can provide various additional benefits or advantages depending on the implementation. For example, the wireless controller 100 can be field-mounted, meaning the wireless controller 100 can be easily mounted in the field at or near the equipment with which the wireless controller 100 will interact. This allows the wireless controller 100 to be easily installed where control functionality is needed, even in remote sites. Also, the wireless controller 100 can support multiple industrial wireless protocols or other trusted and secure protocols in a single wireless infrastructure, which can reduce the complexity of the overall system and reduce or eliminate the need for different access points and gateways that support different protocols. This can also enable users to procure suitable components that use different wireless protocols from a wide variety of vendors. Moreover, the wireless controller 100 allows a site to easily incorporate wireless control functionality into its wireless infrastructure in a secure and reliable manner. In addition, the wireless controller 100 enables easy expansion of a control system into virtually any portion of an industrial site or other location where the wireless controller 100 can be mounted and powered.

Although FIGS. 1 and 2 illustrate one example of a field-mountable remote wireless controller 100 and related details, various changes may be made to FIGS. 1 and 2. For example, components of the field-mountable remote wireless controller 100 could be added, omitted, combined, further subdivided, or placed in any other suitable configuration according to particular needs. Also, any other or additional protocol(s) could be supported by the wireless controller 100.

Figure 3A:
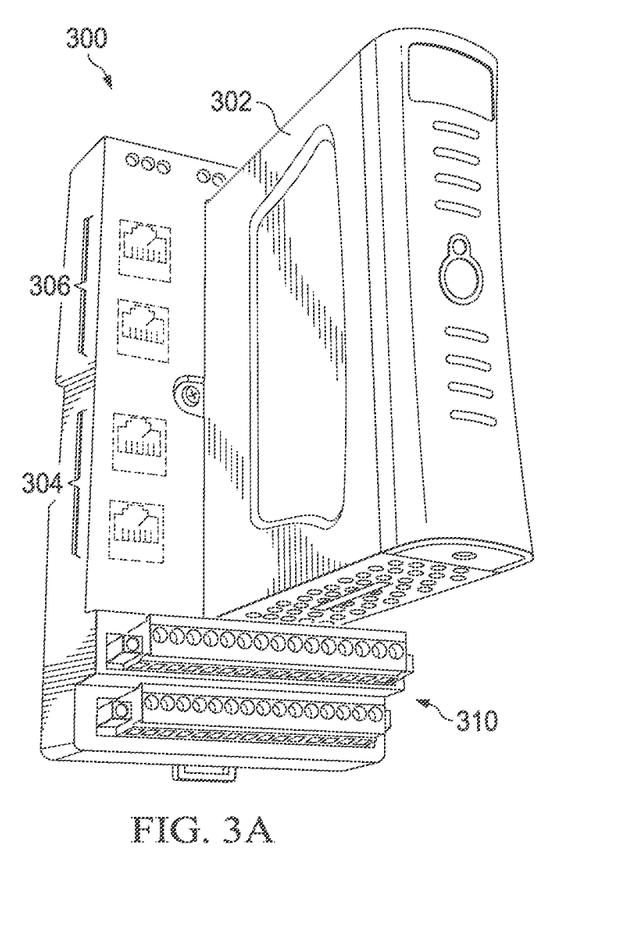
FIGS. 3A through 3C illustrate an example remote terminal unit (RTU) incorporating a field-mountable remote wireless controller in accordance with this disclosure.
Figure 3B:
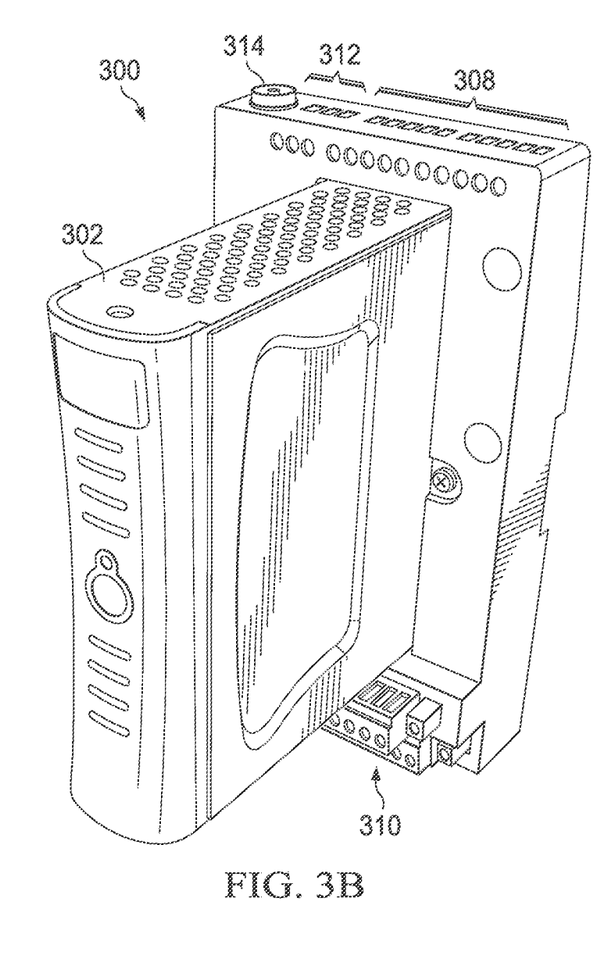
Figure 3C:
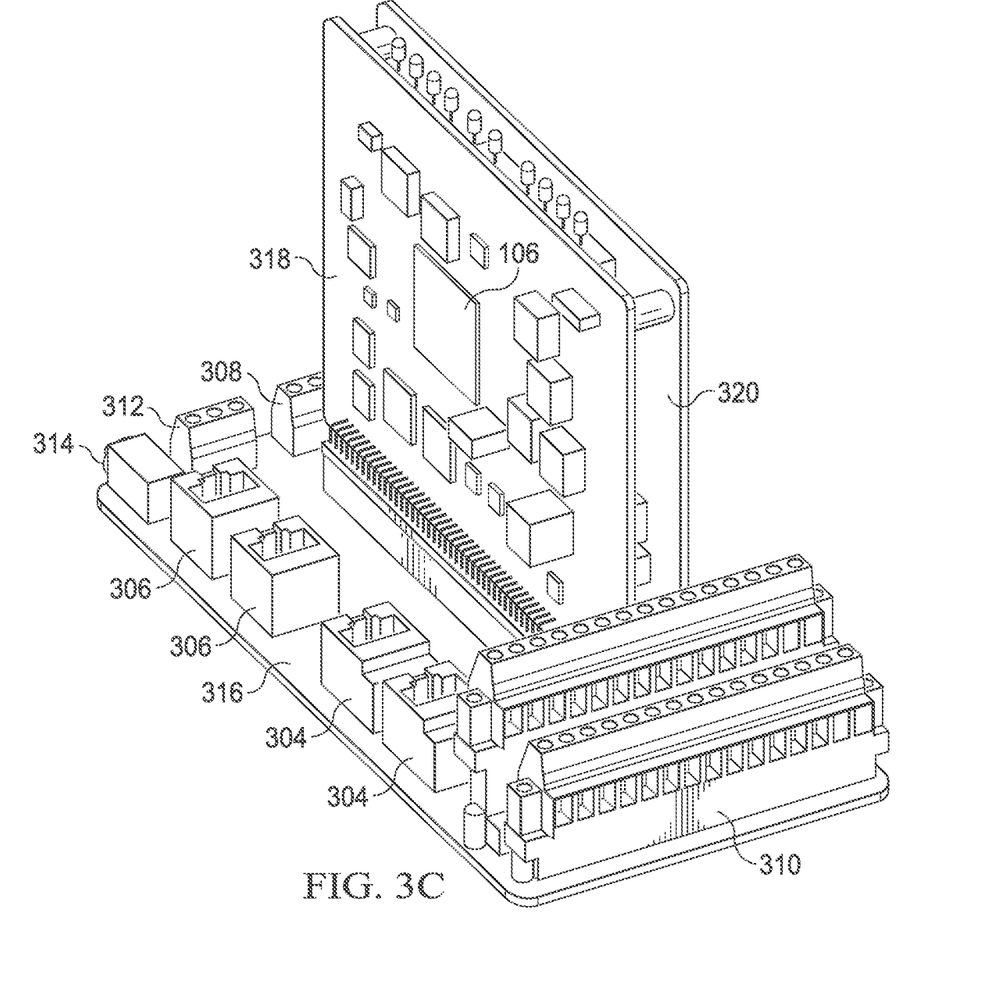

FIGS. 3A through 3C illustrate an example RTU 300 incorporating a field-mountable remote wireless controller in accordance with this disclosure. As shown in FIGS. 3A and 3B, a housing 302 is used to encase and protect other components of the RTU 300. The housing 302 also provides access to various other components of the RTU 300, such as one or more ports or terminals. The housing 302 can have any suitable size, shape, and dimensions and can be formed from any suitable material(s) (such as metal or ruggedized plastic).

The RTU 300 also includes two uplink ports 304, two RS232 ports 306, and two RS485 ports 308. The ports 304 can be used to couple the RTU 300 to higher-level devices, such as a control system. The ports 304 could represent any suitable structures for coupling to one or more communication links, such as Ethernet ports. The RS232 ports 306 and the RS485 ports 308 could be used to couple the RTU 300 to one or more field devices or other devices that use the RS232 or RS485 serial protocol. Note, however, that the use of the RS232 and RS485 serial protocols are not required here and that other suitable protocols could be used.

Various I/O terminals 310 can be used to couple the RTU 300 to one or more field devices. The I/O terminals 310 provide a communication path to each field device coupled to the RTU 300. The I/O terminals 310 can be coupled to various types of field devices, such as analog and digital field devices, depending on the configuration of the I/O channels. The I/O terminals 310 include any suitable structures for coupling to different communication paths, such as screw terminals. A power terminal 312 can be used to couple the RTU 300 to a power supply, such as one or more batteries, solar cells, fuel cells, or other source(s) of electrical power. An antenna terminal 314 can be used to couple the RTU 300 to at least one external antenna, which could represent the antenna 108 described above. For instance, the antenna terminal 314 could represent a coaxial cable connector, BNC connector, SMA connector, N-Type connector, or a connector for another type of cable. Note that the numbers and types of ports and terminals shown in FIGS. 3A through 3C are for illustration only. The RTU 300 could include any suitable type(s) and number(s) of interfaces as needed or desired.

As shown in FIG. 3C, the RTU 300 further includes three printed circuit boards (PCBs). A first circuit board 316 represents the substrate on which the ports 304-308, I/O terminals 310, and other input/output components can be located. The circuit board 316 represents any suitable substrate, such as an Input Output Termination Assembly (IOTA) board. For this reason, the circuit board 316 may be referred to as the IOTA board 316.

A second circuit board 318 and a third circuit board 320 are coupled to the IOTA circuit board 316. The second circuit board 318 represents a board having at least one processing device that executes an operating system or other logic for the RTU 300. For this reason, the circuit board 318 may be referred to as the kernel board 318. The circuit board 318 could also include at least one memory, a power supply or power converter, and one or more communication interfaces. The third circuit board 320 represents an application board that contains I/O modules. The I/O modules of the circuit board 320 are coupled to the I/O terminals 310 and support a specified number of I/O channels. The I/O channels supported by the circuit board 320 could include any suitable I/O channels.

In some embodiments, the kernel board 318 represents or implements the main controller board 104 described above. Also, in some embodiments, the kernel board 318 could include or be coupled to the RF module 106 described above. The RF module 106 could, for instance, be attached to the kernel board 318 by soldering or otherwise mounting the RF module 106 directly on the kernel board 318, or the RF module 106 could be coupled to the kernel board 318 through a small connector on the kernel board 318. As a result, the kernel board 318 could implement the network managers and gateways 204-206, wireless stacks 208-210, interface 212, and access point stacks 214 discussed above. Note, however, that this division is for illustration only. The main controller board 104 and the RF module 106 could be implemented in any other suitable manner in the RTU 300.

Although FIGS. 3A through 3C illustrate one example of an RTU 300 incorporating a field-mountable remote wireless controller, various changes may be made to FIGS. 3A through 3C. For example, the number(s) and type(s) of ports and interfaces shown in FIGS. 3A through 3C are for illustration only. Also, the functional divisions of the RTU 300 are for illustration only. Various components in the RTU 300 could be omitted, combined, or further subdivided and additional components could be added according to particular needs.

Figure 4:
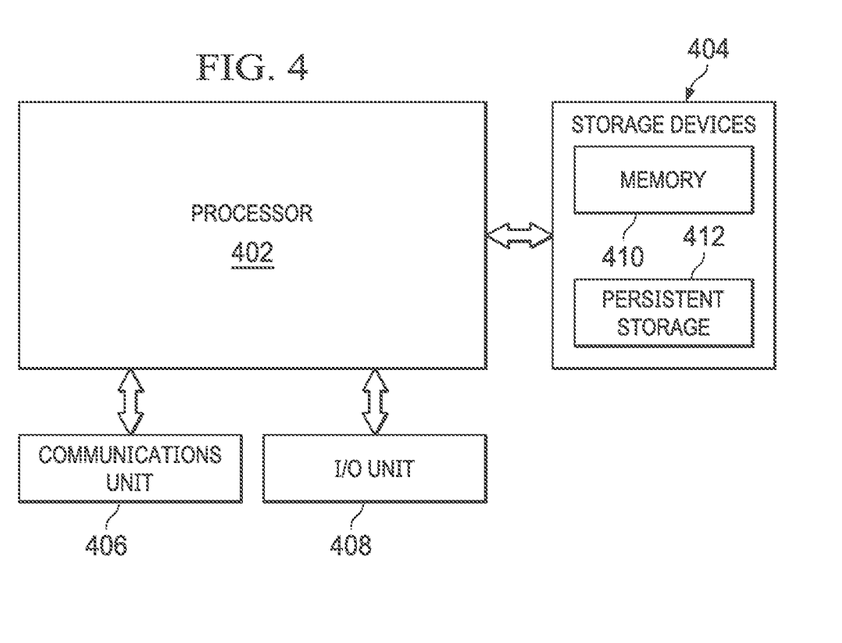
FIG. 4 illustrates example components of a field-mountable remote wireless controller for executing logic of the wireless controller in accordance with this disclosure.

FIG. 4 illustrates example components of a field-mountable remote wireless controller 100 for executing logic of the wireless controller in accordance with this disclosure. In particular, FIG. 4 illustrates example data processing components of a wireless controller 100. These components could, for example, form part of the main controller board 104 of the wireless controller 100 or part of the kernel board 318 of the RTU 300.

As shown in FIG. 4, the wireless controller 100 includes at least one processor 402, at least one storage device 404, at least one communications unit 406, and at least one I/O unit 408. Each processor 402 can execute instructions, such as those that may be loaded into a memory 410. The instructions could implement wireless stacks, network managers, gateways, or other functions of the wireless controller 100 described in this document. Each processor 402 denotes any suitable processing device, such as one or more microprocessors, microcontrollers, digital signal processors, application specific integrated circuits (ASICs), field programmable gate arrays (FPGAs), or discrete circuitry.

The memory 410 and a persistent storage 412 are examples of storage devices 404, which represent any structure(s) capable of storing and facilitating retrieval of information (such as data, program code, and/or other suitable information on a temporary or permanent basis). The memory 410 may represent a random access memory or any other suitable volatile or non-volatile storage device(s). The persistent storage 412 may contain one or more components or devices supporting longer-term storage of data, such as a read only memory, hard drive, Flash memory, or optical disc.

The communications unit 406 supports communications with other systems or devices. For example, the communications unit 406 could include a network interface card or a wireless transceiver facilitating communications over a wired or wireless network, such as through the various ports or other connections of the RTU 300. The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display, printer, or other suitable output device. Note, however, that the I/O unit 408 may not be needed, such as when the wireless controller 100 is controlled over a network connection and local I/O is not used.

Although FIG. 4 illustrates one example of components of a field-mountable remote wireless controller 100 for executing logic of the wireless controller, various changes may be made to FIG. 4. For example, computing devices and other controllers can come in a wide variety of configurations, and FIG. 4 does not limit this disclosure to any particular configuration of computing device or controller. Also, components of the field-mountable remote wireless controller 100 could be added, omitted, combined, further subdivided, or placed in any other suitable configuration according to particular needs.

Figure 5:
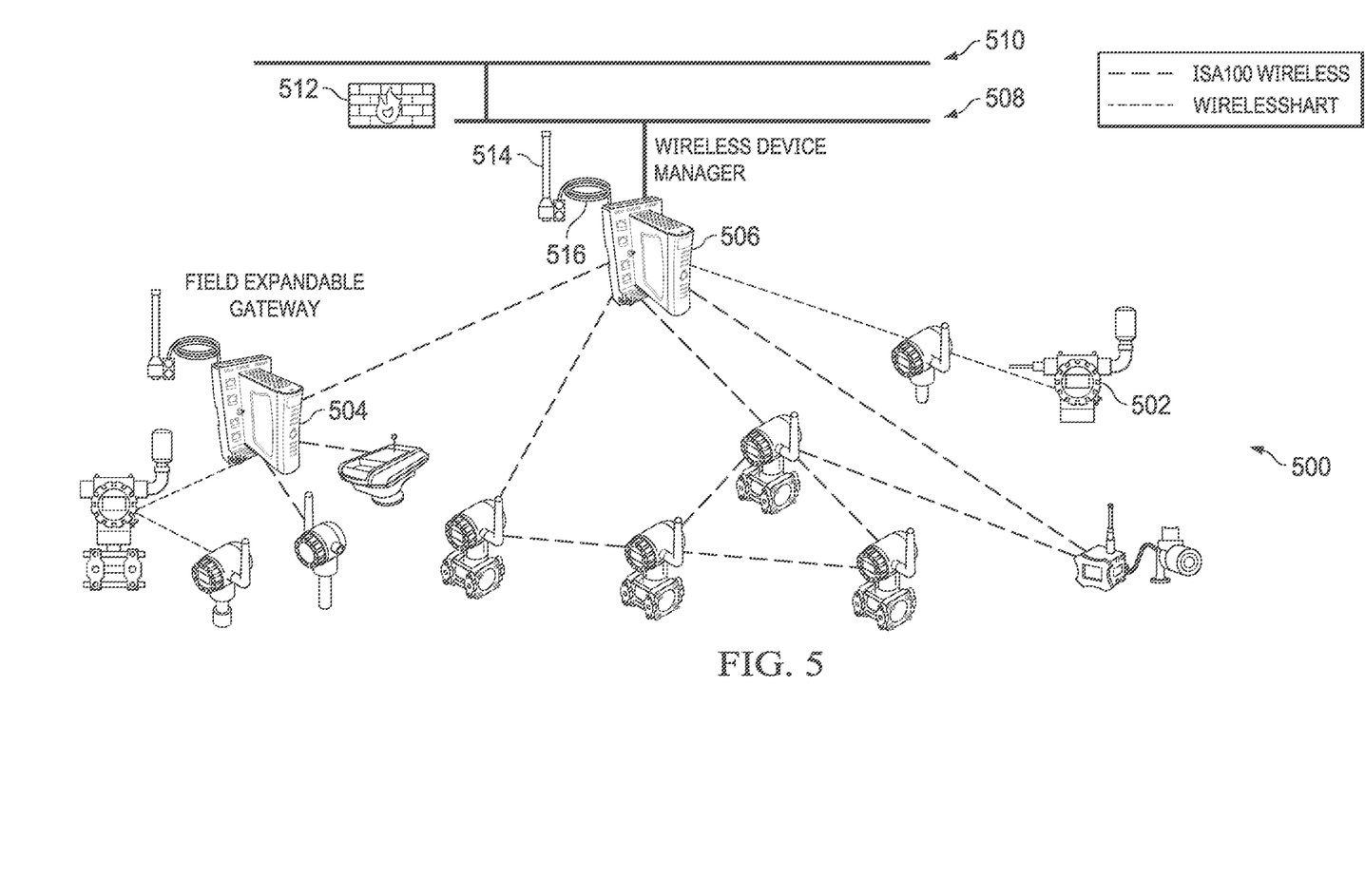
FIGS. 5 through 7 illustrate example systems containing one or more field-mountable remote wireless controllers in accordance with this disclosure.
Figure 6:
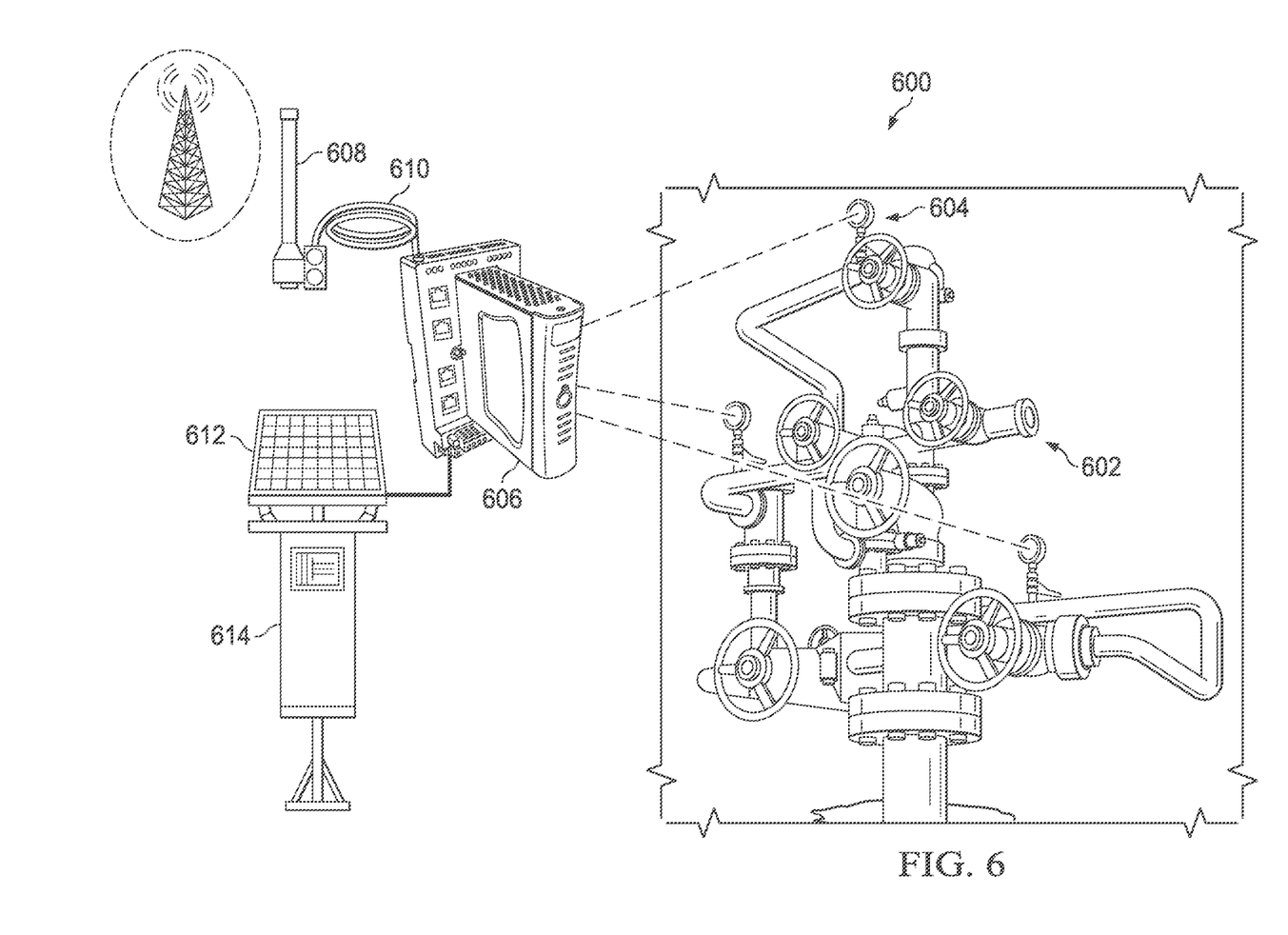
Figure 7:
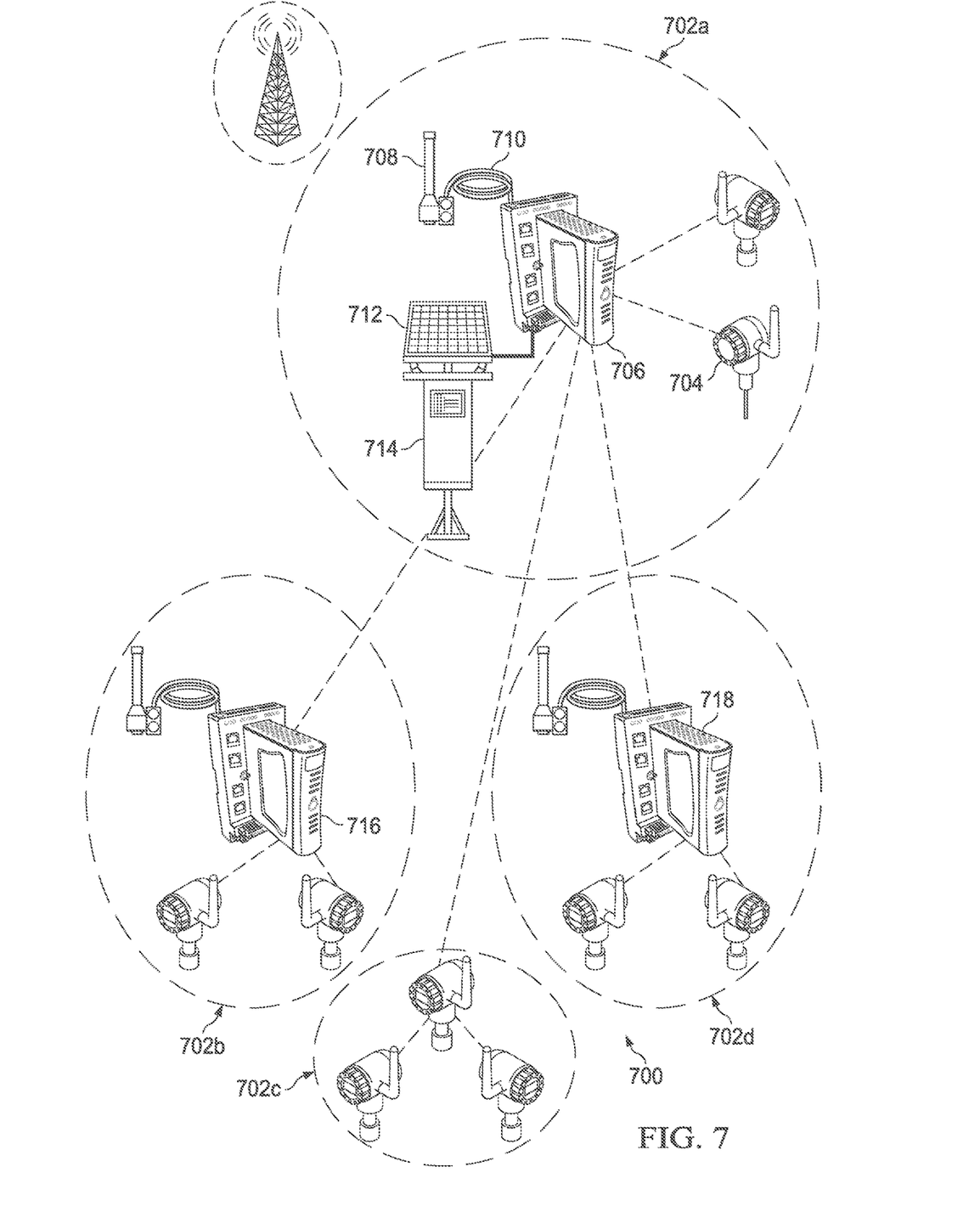

FIGS. 5 through 7 illustrate example systems containing one or more field-mountable remote wireless controllers in accordance with this disclosure. As shown in FIG. 5, a system 500 includes various field devices 502, which denote sensors, actuators, or other devices that are installed in the field and that are associated with one or more industrial processes or other processes. In this example, there are field devices 502 that communicate via the ISA100 and WirelessHART protocols, although the field devices 502 could support any other or additional protocol(s).

At least one field expandable gateway 504 can be provided in the system 500. The field expandable gateway 504 can represent one instance of the wireless controller 100. Thus, the field expandable gateway 504 can receive data from local sensor field devices 502, execute control logic, and provide control signals to local actuator field devices 502. The field expandable gateway 504 can also provide access point and gateway functionality.

At least one wireless device manager 506 can be provided in the system 500. The wireless device manager 506 can represent another instance of the wireless controller 100. Thus, the wireless device manager 506 can receive data from local sensor field devices 502, execute control logic, and provide control signals to local actuator field devices 502. The wireless device manager 506 can also provide access point and gateway functionality, such as to support communications over a process control network 508.

The process control network 508 generally operates to transport data used by various devices for process control or automation functions. A higher-level network 510, such as a business network, could be used for various purposes, including interactions with devices connected to the process control network 508. At least one firewall 512 could be provided between the networks 508-510. Note, however, that process control and automation systems come in a wide variety of configurations, and FIG. 5 does not limit use of the field-mountable remote wireless controller 100 in any specific system.

As can be seen in FIG. 5, each field expandable gateway 504 and wireless device manager 506 is coupled to at least one external antenna 514, which could represent the antenna 108 described above. A cable 516 can be used to couple the field expandable gateway 504 or wireless device manager 506 to its antenna(s) 514. In some embodiments, the cable 516 could represent a coaxial cable. This allows separation of the other components of the field expandable gateway 504 or wireless device manager 506 and the associated antenna(s) 514. Among other things, this could allow each antenna 514 to be positioned in a suitable location for wireless communication.

As shown in FIG. 6, a system 600 includes wellhead equipment 602, which generally includes equipment used to facilitate the extraction of oil or gas from an underground reservoir through a single well. Multiple sensors 604 are connected at various locations of the wellhead equipment 602 and can be used to capture various types of measurements. As examples, the sensors 604 could include a wellhead pressure transmitter, a flowline temperature transmitter, a flowline pressure transmitter, a safety selector valve (SSV) status transmitter, and a downstream pressure transmitter. Of course, any other or additional sensors 604 could be used, based at least in part on the equipment 602 being monitored. The sensors 604 could use one or multiple protocols, such as the ISA100 and WirelessHART protocols, although the sensors 604 could support any other or additional protocol(s).

The sensors 604 communicate measurements to an RTU 606, which could represent the RTU 300 described above and could implement the wireless controller 100 described above. The RTU 606 can use the sensor measurements from the sensors 604 to perform various control actions, such as by generating control signals for one or more actuators based on the sensor measurements. The RTU 606 is coupled to at least one external antenna 608, which could represent the antenna 108 described above. A cable 610, such as a coaxial cable, can be used to couple the RTU 606 to the antenna(s) 608. Again, this allows separation of the RTU 606 and the antenna(s) 608, which could allow the antenna(s) 608 to be positioned in a suitable location for wireless communication.

In this example, the RTU 606 is powered using at least one solar panel 612 and a battery bank 614. The solar panel 612 can generate electrical energy from sunlight, and the battery bank 614 can store the electrical energy and provide the electrical energy to the RTU 606 for use. Note, however, that any other suitable power source could be used to power the RTU 606, such as one or more fuel cells or an AC distribution grid.

As shown in FIG. 7, a system 700 includes equipment used to facilitate extraction of oil or gas from at least one underground reservoir through multiple wells 702a-702d. Each well 702a-702d is associated with one or more sensors 704 that capture various types of measurements about the well's equipment. Example types of sensors 704 are described above. Note that any numbers of wells 702a-702d could be used here and that each well 702a-702d could include any suitable number(s) and type(s) of sensors 704.

The well 702a in this example is associated with an RTU 706, which is coupled to at least one antenna 708 by a cable 710 and which receives power from at least one solar panel 712 and a battery bank 714. These components 706-714 could be the same as or similar to the corresponding components 606-614 described above. As can be seen here, the RTU 706 is able to communicate with sensors 704 or other local field devices associated with the well 702a and possibly with field devices associated with other wells, such as the well 702c. The RTU 706 can also communicate with one or more additional RTUs 716-718 associated with one or more other wells 702b, 702d. Each of the additional RTUs 716-718 could be used to communicate with sensors 704 or other local field devices of the associated well and relay information to and from the RTU 706. Using the same terminology from FIG. 5, the RTU 706 can be said to represent a wireless device manager, while the additional RTUs 716-718 can be said to represent field expandable gateways. Each RTU 706, 716, 718 can use the sensor measurements from its associated sensor(s) 704 to perform various control actions, such as by generating control signals for one or more associated actuators based on the sensor measurements.

Although FIGS. 5 through 7 illustrate examples of systems containing one or more field-mountable remote wireless controllers, various changes may be made to FIGS. 5 through 7. For example, one or more field-mountable remote wireless controllers could be used in any other suitable systems. Example uses of the field-mountable remote wireless controllers include wellheads, tank farms, water processing or storage facilities, pipelines, solar power farms, pharmaceutical manufacturing or processing facilities, specialty chemical manufacturing or processing facilities, or marine environments. Multiple field-mountable remote wireless controllers could be used in any suitable peer-to-peer environments or other environments. In general, one or more wireless controllers 100 could be used in any suitable manner, and FIGS. 5 through 7 do not limit the wireless controller 100 to any particular use.

Figure 8:
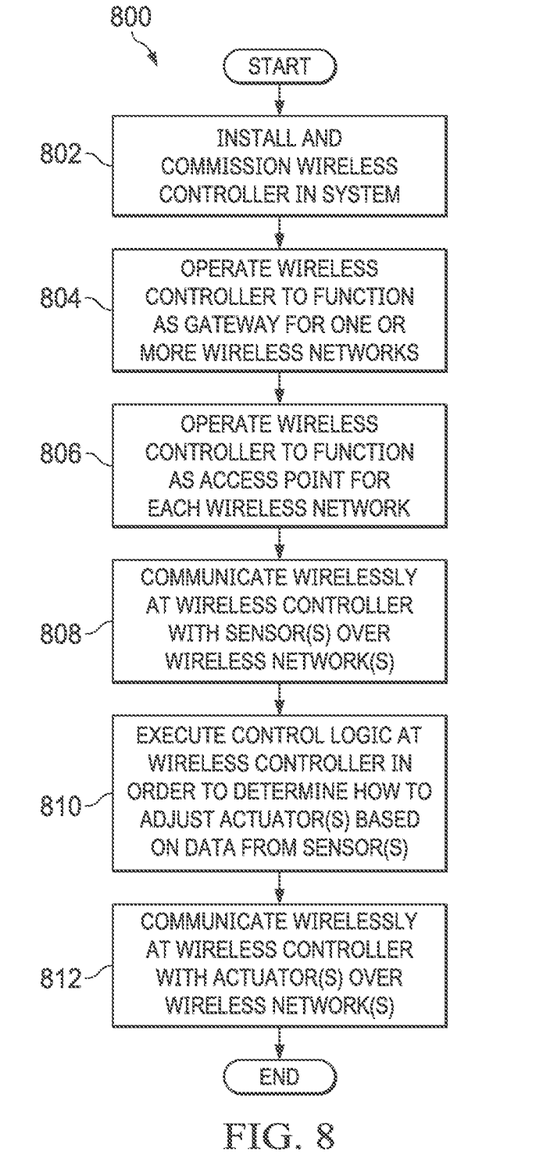
FIG. 8 illustrates an example method for using a remote wireless controller in an industrial process control and automation system or other system in accordance with this disclosure.

FIG. 8 illustrates an example method 800 for using a remote wireless controller in an industrial process control and automation system or other system in accordance with this disclosure. For ease of explanation, the method 800 is described as involving the use of the field-mountable remote wireless controller 100 of FIGS. 1 and 2. However, the method 800 could involve the use of any suitable remote wireless controller designed in accordance with this disclosure.

As shown in FIG. 8, a wireless controller is installed and commissioned in an industrial process control and automation system or other system at step 802. This could include, for example, physically installing the wireless controller 100 and programming the wireless controller 100 for desired control operations. The wireless controller 100 can be field-mountable, meaning the wireless controller 100 can be designed and housed for installation in the field, such as in an equipment cabinet or other field location. As a particular example, the wireless controller 100 could be integrated into the RTU 300, which is designed for field installation. The wireless controller 100 can be programmed for desired control operations by setting up the desired controller logic 202 for the wireless controller 100. This configures the wireless controller 100 to control a suitable industrial process or other process, such as a process involving one or more wellheads, a tank farm, a water processing or storage facility, a pipeline, a solar power farm, a pharmaceutical manufacturing or processing facility, a specialty chemical manufacturing or processing facility, or a marine environment.

The wireless controller is operated to function as a gateway for each of one or more wireless networks at step 804 and to function as an access point for each of the one or more wireless networks at step 806. This could include, for example, the main controller board 104 executing one or more network managers and gateways 204-206 to provide the gateway functionality. This could also include main controller board 104 executing one or more wireless stacks 208-210 to support communications over one or more wireless networks. This could further include the RF module 106 executing the access point stack(s) 214 to provide the access point functionality. As noted above, the access point functionality supports communication with and among different devices over one or more wireless networks, and the gateway functionality supports data transfers between the wireless network(s) and at least one other network. Note that a single wireless network or multiple wireless networks could be supported here, and the wireless network(s) could support any suitable protocol or protocols (such as ISA100 and/or WirelessHART).

The wireless controller communicates wirelessly with one or more sensors or other data source(s) over the one or more wireless networks at step 808. This could include, for example, the RF module 106 receiving data wirelessly from one or more sensors. The wireless controller executes control logic to determine how to adjust the operation of one or more actuators based on data from the one or more sensors or other data source(s) at step 810. This could include, for example, the controller board 104 executing the controller logic 202 in order to process the data from the one or more sensors and generate one or more control signals for one or more actuators. The controller logic 202 could have any suitable form, such as multiple function blocks (where at least one function block is designed for wireless control). The wireless controller communicates wirelessly with the one or more actuators over the one or more wireless networks at step 812. This could include, for example, the RF module 106 wirelessly transmitting the one or more control signals to the one or more actuators.

Although FIG. 8 illustrates one example of a method 800 for using a remote wireless controller in an industrial process control and automation system, various changes may be made to FIG. 8. For example, while shown as a series of steps, various steps in FIG. 8 could overlap, occur in parallel, occur in a different order, or occur any number of times. As a particular example, steps 804-806 generally overlap with one another and with steps 808-812. Also, while wireless communications with the sensor(s) and actuator(s) are shown here, the wireless controller 100 could communicate with at least one sensor and/or at least one actuator through I/O terminals and wired connections.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a wireless controller comprising:
at least one processor operating to execute control logic in order to determine how to adjust at least one actuator based on data from at least one sensor; and
a radio frequency (RF) module operating to communicate wirelessly with at least one of the at least one sensor and the at least one actuator over one or more wireless networks;
wherein the at least one processor is also operating to function as a gateway for each of the one or more wireless networks supporting one or more wireless protocols operating to execute one or more protocol stacks to function as the gateway for the one or more wireless networks;
wherein the RF module is also operating to function as an access point for each of the one or more wireless networks, the RF module associated with one or more access point protocol stacks to function as the access point for the one or more wireless networks; and
wherein the wireless controller integrates the gateway and the access point into a single functional unit.

2. The apparatus of claim 1, wherein the wireless controller is field-mountable.

3. The apparatus of claim 1, wherein the control logic comprises multiple function blocks, including at least one function block designed for wireless control.

4. The apparatus of claim 1, wherein the wireless controller comprises a remote terminal unit (RTU).

5. A method comprising:
operating a wireless controller to function as a gateway for each of one or more wireless networks supporting multiple wireless protocols;
operating the wireless controller to function as an access point for each of the one or more wireless networks, the wireless controller executes multiple protocol stacks to function as the gateway for the multiple wireless networks;
executing control logic at the wireless controller in order to determine how to adjust at least one actuator based on data from at least one sensor;
communicating wirelessly with at least one of the at least one sensor and the at least one actuator over the one or more wireless networks,
wherein the wireless controller executes multiple access point protocol stacks to function as the access point for the multiple wireless networks; and
wherein the wireless controller integrates the gateway and the access point into a single functional unit.

6. The method of claim 5, further comprising:
field-mounting the wireless controller.

7. The method of claim 5, wherein the control logic comprises multiple function blocks, including at least one function block designed for wireless control.

8. The method of claim 5, wherein the wireless controller comprises a remote terminal unit (RTU).

9. At least one non-transitory computer readable medium containing instructions that when executed cause a wireless controller to:
    function as a gateway for each of one or more wireless networks supporting multiple wireless protocols;
    function as an access point for each of the one or more wireless networks, the wireless controller executes multiple protocol stacks to function as the gateway for the multiple wireless networks;
    execute control logic at the wireless controller in order to determine how to adjust at least one actuator based on data from at least one sensor; and
    communicate wirelessly with at least one of the at least one sensor and the at least one actuator over the one or more wireless networks,
    wherein the instructions that when executed cause the wireless controller to function as the access point comprise multiple access point protocol stacks configured to allow the wireless controller to function as the access point for the multiple wireless networks, and
    wherein the wireless controller integrates the gateway and the access point into a single functional unit.

10. The at least one non-transitory computer readable medium of claim 9, wherein the multiple protocol stacks and the multiple access point protocol stacks support multiple industrial wireless protocols.

11. The at least one non-transitory computer readable medium of claim 9, wherein the control logic comprises multiple function blocks, including at least one function block designed for wireless control.

\* \* \* \* \*